ALVIN V. LEWIS
INVENTOR.

BY Allen E Hambly
ATTORNEY

United States Patent Office 2,969,677
Patented Jan. 31, 1961

2,969,677

STRESS ADJUSTING APPARATUS

Alvin V. Lewis, West Covina, Calif., assignor to Borg-Warner Corporation, Chicago, Ill., a corporation of Illinois Filed Sept. 30, 1955, Ser. No. 537,750

10 Claims. (Cl. 73—398)

The present invention relates to a unique stress adjusting apparatus. It may be used to alter tensile or compressive stress in a wire, rope, string, bar, etc., wherever a fine, or a coarse adjustment of applied force is required. It has special application in connection with the adjustment of tension of a vibrating wire in the very sensitive gages such as disclosed in U.S. Patent 2,447,817.

In the gage referred to, a vibrating wire is made to change natural frequency as a result of a change in tension, which in turn is a reflection of a change in a variable being measured. A minute change in tension will bring about a relatively great change in frequency of the wire. It is vitally necessary therefore that starting tension be set at an exactly predetermined value, so that the gage will operate in the range designed for, and so that it can be accurately calibrated. The present invention provides a means for tensioning the wire with the fine adjustment required.

The invention utilizes two centrally apertured diaphragms separated by means of an annular end flange on one diaphragm. One diaphragm is made to be thicker than the other one. Through the central aperture in the diaphragms there is passed a cylindrical operating member, flanged at one end to bear against the inner face of the thicker diaphragm. The operating member is threaded at its other end, and a tension adjustment nut rides on it. The nut bears against the outer side of the thin diaphragm. The operating member acts as fastening fixture for one end of the vibrating wire since the wire is fastened within it. The other end of the wire is fastened to a support piece on a diaphragm which flexes according to change in the variable being gaged.

The operating member is normally immovable, after it has been given a predetermined set. The set is obtained by rotating the adjustment nut. Rotation of the nut causes the two tension adjusting diaphragms to be squeezed together with equal force between the nut and the flanged head of the operating member. However, as explained below, both diaphragms do not flex an equal amount, and the operating member moves only a relatively small distance with each turn of the nut because it moves with the diaphragm that does not flex greatly. Since the wire is attached to the operating member it is possible to obtain a very fine adjustment of wire tension by means of relatively great rotative travel of the nut.

The delicacy of adjustment is obtained as a result of the different thickness of the two diaphragms. Since flexure at the center of a diaphragm is generally proportional to the cube of its thickness, if the flexure is not too great, it will be seen that if the two diaphragm thicknesses are in the ratio of 3:1 for example, the thicker one will flex only about 1/27 as much as will the thinner one. The flanged operating member abuts and moves with the thicker diaphragm. Since almost all the squeeze exerted by the tension adjustment nut is seen to be taken by the thinner diaphragm, the operating member moves very little per each rotation of the nut. Thus the vibrating wire, fastened to the operating member, may be easily and accurately tensioned to the desired initial set.

It will be observed that the exact ratio of turns of the nut to axial distance moved by the operating member is also dependent on the pitch of the threads on the operating member. This can of course be varied to give desired operating characteristics.

Obviously the double diaphragm arrangement has wide application; it is not limited to use in tensioning the vibrating wire of a gage. By selecting suitable diaphragm thickness ratios, varying degrees of control can be obtained; the 3:1 diaphragm thickness ratio set forth above is only illustrative of a fine adjustment combination. The ratio can be varied so that it is inverse, that is to say until the position of the thicker diaphragm is reversed with that of the thinner one. If that is the case a very small amount of rotation of the tension nut will cause relatively great variation in wire tension.

It is also seen that the invention may be used to adjust thrust rather than tension. If for some reason it were desirable to apply compression to a member, and either a very fine adjustment or a relatively large one were needed, through a small range, the double diaphragm arrangement could be used.

Accordingly it is an object of the present invention to provide an adjustment means for varying the stress on an object under tension or compression.

It is a further object of the invention to provide a very fine adjustment means for varying the stress on an object under tension or compression.

It is a further object of the invention to provide a coarse adjustment means for varying the stress on an object under tension or compression.

It is a still further object of the invention to provide a double diaphragm adjustment frame which is capable of adjusting stress on an object under tension or compression.

It is a still further object of the invention to provide a stress adjustment frame comprising two juxtaposed diaphragms of different thicknesses, an operating member passed through the center of the diaphragms, and means to adjust the position of the operating member by an amount depending on the ratio of diaphragm thicknesses.

Various other objects and advantages of the invention will be better understood from a study of the following specification and drawings:

Figure 1:
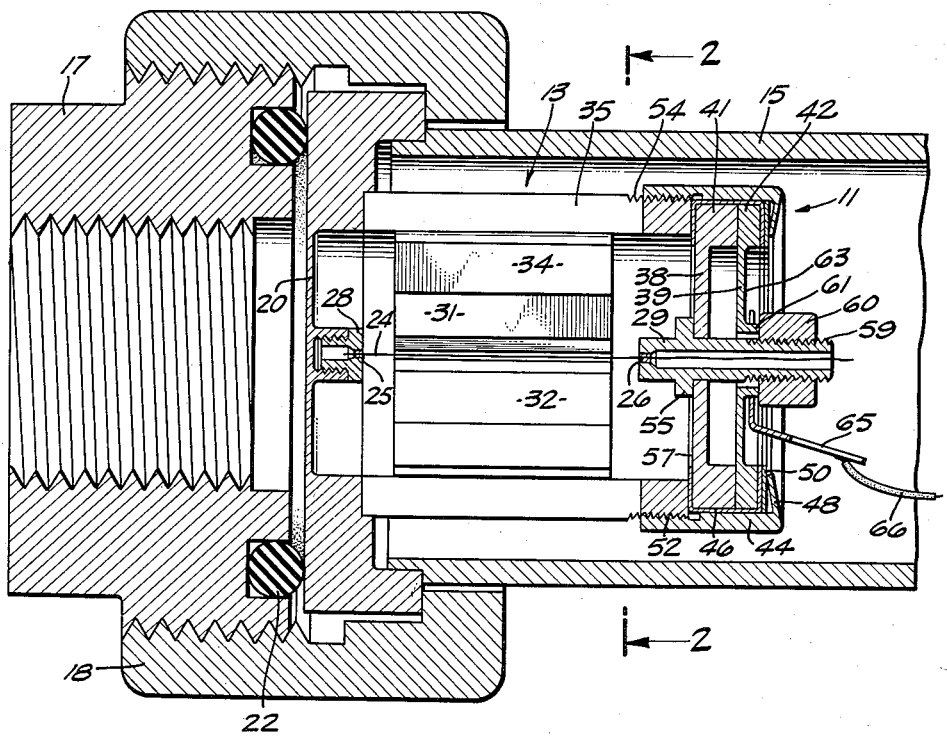
Figure 1 is an elevational view of the adjustment mechanism as used in connection with a vibrating wire type gage.
Figure 2:
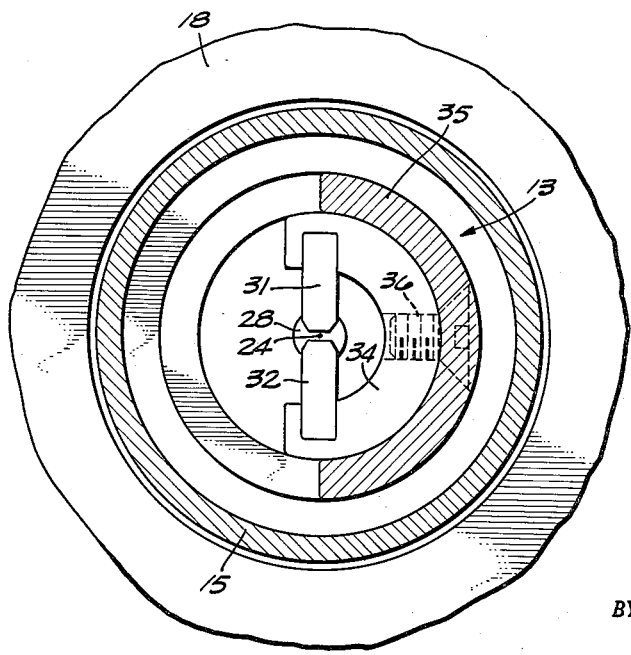
Figure 2 is a cross sectional view of Figure 1 taken along the line 2—2.

The double diaphragm adjustment frame 11, is illustrated in connection with a pressure gage 13. Both are mounted within a casing comprising tubular member 15, pressure fitting 17 and lock nut 18. It will be seen that pressure fluid may be admitted through the fitting 17 so as to act against the diaphragm 20. The pressure is sealed within the pressure fitting by means of the seal ring 22. Change in pressure changes the position of diaphragm 20, which in turn is effective to vary the tension on vibrating wire 24. Vibrating wire 24 is fastened at 25 to the mounting member 28 and at 26 to the operating member 29. The vibrating wire 24 passes between the extension poles 31 and 32 of the semicylindrical permanent magnet 34 (see Figure 2). The semicylindrical magnet 34 is in turn held in place within the body section 35 by means of the screw 36.

The operating member 29 passes through the center of the diaphragms 38 and 39. Diaphragm 38 is thicker in cross section than is diaphragm 39. The two diaphragms having contiguous flange portions 41 and 42 respectively. The diaphragms are insulated from the body section 35 and cap 44 by means of the ceramic insulation 46. The diaphragms are held in position by means of the cap 44 which has a flange 48 bearing upon the annular washer 50, which in turn presses against an inturned portion of the ceramic insulation 46. The cap 44 is internally threaded at 52 so as to tighten upon the externally threaded portion 54 of the body section 35.

The operating member 29 has a head flange 55 which bears upon the inner face 57 of diaphragm 38. The operating member 29 is screw threaded at 59 so that tension adjustment nut 60 can be rotated thereon. The nut 60 bears against an annular flange 61 which is contiguous with the outer face 63 of diaphragm 39. Contact member 65 is soldered onto the flange 61 and electrical lead 66 is connected to the contact member.

As set forth earlier, the position of diaphragm 20 is varied according to changing pressure within fitting 17. This changed position of the diaphragm 20 is effective to alter the tension on the wire 24. Wire 24 is part of an electrical circuit which includes the wire 66, the contact 65, the operating member 29 and the grounded mounting member 28. The diaphragms 38 and 39, which are metallic, do not short circuit the vibrating wire inasmuch as they are insulated by means of the ceramic insulation 46. The wire 24 vibrates in the magnetic field between poles 31 and 32 at a natural frequency which is dependent on the applied tension. As the tension changes due to flexing of the diaphragm 20, the signal reflected back through wire 66 to an amplifier circuit, not shown, will change.

It will be appreciated that since the gage is very sensitive to minute pressure variations within the fitting 17 it is very important for the gage to operate within the range designed for it. This means that the tension on the wire 24 must be given a very fine initial adjustment so that the output signal will conform to an initial operating condition. Once this has been done accurately, the gage can be properly calibrated throughout the design range.

The adjustment of the wire is accomplished by means of the double diaphragm frame 11. Within frame 11 diaphragm 38 is made to be approximately three times as thick in cross section as diaphragm 39. As adjustment nut 60 is rotated on the screw threads 59, the two diaphragms 38 and 39 will be squeezed together. Since diaphragm flexure at the center thereof is generally proportional to the cube of diaphragm thickness, diaphragm 38 will flex outwardly only about $\frac{1}{27}$ as much as will diaphragm 39 flex inwardly. Since the flange 55 of sleeve member 29 moves with the diaphragm 38 the sleeve 29 will move only a very short distance for a relatively large number of rotations of nut 60. The fine adjustment required is therefore obtained.

It will be seen that the inventive principle is susceptible of various modifications to obtain a desired result. The number of rotations of nut 60 required to change the tension of wire 24 can be adjusted by a proper choice of pitch of the threads 59. Similarly, if it were desired to obtain a coarse adjustment wherein a small amount of rotation of nut 60 was effective to produce a relatively great change in tension of wire 24, the thickness ratios of the diaphragms 38 and 39 could be changed. Thus if diaphragm 38 were $\frac{1}{3}$ as thick as diaphragm 39, diaphragm 38 would flex outwardly 27 times as far as would diaphragm 39 flex inwardly. This would of course cause a rapid change in tension of wire 24. Also, the stress adjustment mechanism could be used to provide a fine or coarse adjustment of compression rather than tension by a suitable structural rearrangement. Still further, if desired, other flexible members beside diaphragms might be utilized. And still further, difference in flexion can be obtained by using dissimilar flexible members of the same thickness, but of different stiffness. Such changes and variations, as well as others, may be made without departing from the spirit and scope of the invention as defined in the appended claims.

What I claim is:

1. In a vibrating wire device having a member subjected to a variable force to be gauged, a vibrating wire attached at one end to said member, means for adjusting the initial tension of said wire, said wire being attached at its other end to said adjusting means, and means providing a magnetic field in which said wire vibrates at varying frequencies depending upon the force to which the member aforesaid is subjected, that improvement wherein said adjusting means includes a pair of adjacent flexible members having different characteristics of stiffness, said flexible members having aligned openings, a threaded stem extending through said openings, and elements extending radially from said stem and engaged with the respective flexible members, one of said radial elements being threadedly supported on said stem for relatively flexing the flexible members upon relative rotation of said latter element and said stem, said wire being operatively connected to the adjusting means for adjustment of the tension of the wire in proportion to the difference in the characteristics of stiffness of the flexible members.

2. In a vibrating wire device having a member subjected to a variable force to be gauged, a vibrating wire attached at one end to said member, means for adjusting the initial tension of said wire, said wire being attached at its other end to said adjusting means, and means providing a magnetic field in which said wire vibrates at varying frequencies depending upon the force to which the member aforesaid is subjected, that improvement wherein said adjusting means includes a pair of adjacent flexible diaphragms having different characteristics of flexure, said diaphragms having aligned openings, a threaded stem extending through said openings, and elements extending radially from said stem and engaged with the respective diaphragms, one of said radial elements being threadedly supported on said stem for relatively flexing the diaphragms upon relative rotation of said latter element and said stem, said wire being operatively connected to the adjusting means for adjustment of the tension of the wire in proportion to the difference in characteristics of flexure of the diaphragms.

3. In a vibrating wire device having a member subjected to a variable force to be gauged, a vibrating wire attached at one end to said member, means for adjusting the initial tension of said wire, said wire being attached at its other end to said adjusting means, and means providing a magnetic field in which said wire vibrates at varying frequencies depending upon the force to which the member aforesaid is subjected, that improvement wherein said adjusting means includes a pair of spaced diaphragms having aligned openings, a threaded stem extending through said openings, and means including a nut threaded on said stem and engaged with the respective diaphragms for relatively flexing the diaphragms upon threaded adjustment of said nut upon said stem, said wire being operatively connected to the adjusting means for adjustment of the tension of the wire in proportion to the difference in the thickness of the diaphragms.

4. In a device comprising a wire, the tension of which is to be varied, one end of said wire being stationary, and means for adjusting the tension of said wire, said wire being attached at its other end to said adjusting means, that improvement wherein said adjusting means includes a pair of spaced diaphragms having aligned openings, a threaded stem extending through said openings, and means including a nut threaded on said stem and engaged with the respective diaphragms for relatively flexing the diaphragms upon threaded adjustment of said nut upon said stem, said wire being operatively connected to the adjusting means for adjustment of the tension of the wire in proportion to the difference in the thickness of the diaphragms.

5. In a device comprising a wire, the tension of which is to be varied, one end of said wire being stationary, and means for adjusting the tension of said wire, said wire being attached at its other end to said adjusting means, that improvement wherein said adjusting means includes a pair of flexible members having aligned openings, a threaded stem extending through said openings, and elements extending radially from said stem and engaged with said flexible members; one of said radial elements being threadedly supported on said stem for relatively flexing the flexible members upon relative rotation of the latter element and said stem, said wire being operatively connected to the adjusting means for adjustment of the tension of the wire in proportion to the difference in the flexibilities of said flexible members.

6. In a device comprising a given member the stress of which is to be varied, said given member having a stationary portion, and means for adjusting the stress of said given member, that improvement wherein said adjusting means includes a pair of spaced flexible members having aligned openings, a stem extending through said openings and engaging one of said flexible members, and a fastening member adjustably fixed on said stem and engaging the other of said flexible members for relatively flexing said flexible members upon adjustment of said fastening member upon said stem, said given member being operatively connected to the adjusting means for adjustment of the stress of said given member in proportion to the difference in the flexibilities of said flexible members.

7. In a device comprising a given member the tension of which is to be varied, said given member having a stationary portion, and means for adjusting the tension of said given member, that improvement wherein said adjusting means includes a pair of spaced flexible members having aligned openings, a stem extending through said openings and engaging one of said flexible members, and a fastening member adjustably fixed on said stem and engaging the other of said flexible members for relatively flexing said flexible members upon adjustment of said fastening member upon said stem, said given member being operatively connected to the adjusting means for adjustment of the tension of said given member in proportion to the difference in the flexibilities of said flexible members.

8. In a device comprising a wire the stress of which is to be varied, one end of said wire being stationary, and means for adjusting the stress of said wire, that improvement wherein said adjusting means includes a pair of spaced flexible members having aligned openings, a stem traversing said openings and having means engaging one of said flexible members, and a fastening member adjustably fixed on said stem and engaging the other of said flexible members for relatively flexing said flexible members upon adjustment of said fastening member upon said stem, one end of said wire being operatively connceted to the adjusting means for adjustment of the stress of said wire in proportion to the difference in the flexibilities of said flexible members.

9. In a device comprising a given member, the stress of which is to varied, said given member having a stationary portion and means for adjusting the stress of said given member, that improvement wherein said adjusting means includes a pair of spaced flexible members having portions stationary with respect to the stationary portion of said given member and flexible portions provided with aligned openings, a stem extending through said openings and provided with means engaging one of said flexible members, and a fastening member adjustably fixed on said stem and engaging the other of said flexible members for relatively flexing said flexible members upon adjustment of said fastening member upon said stem, said given member being operatively connected to the adjusting means for adjustment of the stress of said given member in proportion to the difference in the flexibilities of said flexible members.

10. In a device comprising a wire the tension of which is to be varied, one end of said wire being stationary, and means for adjusting the tension of said wire, that improvement wherein said adjusting means includes a pair of spaced diaphragms having stationary peripheral portions and flexible central portions formed with aligned openings, a threaded stem extending through said openings and having an enlarged portion engaging one of said diaphragms, and a nut threadedly fixed on said stem and engaging the other of said diaphragms for relatively flexing said diaphragms upon threaded adjustment of said nut on said stem, said wire being operatively connected to said stem for adjustment of the tension of said wire in proportion to the difference in the flexibilities of said diaphragms.

References Cited in the file of this patent

UNITED STATES PATENTS

| | | |
|---|---|---|
| 2,319,011 | Meredith | May 11, 1943 |
| 2,383,997 | Sweet | Sept. 4, 1945 |
| 2,503,649 | Zimmerman | Apr. 11, 1950 |
| 2,604,787 | Coyne et al. | July 29, 1952 |
| 2,750,796 | Knoll et al. | June 19, 1956 |